United States Patent [19]

Nagashima et al.

[11] Patent Number: 5,029,393

[45] Date of Patent: Jul. 9, 1991

[54] CHAIN SAW

[75] Inventors: Akira Nagashima; Takayuki Yamamoto, both of Tokyo, Japan

[73] Assignee: Kioritz Corporation, Tokyo, Japan

[21] Appl. No.: 507,649

[22] Filed: Apr. 9, 1990

[30] Foreign Application Priority Data

Apr. 15, 1989 [JP] Japan .............................. 1-44219[U]

[51] Int. Cl.[5] ...................... B23D 57/02; B23D 57/00; B27B 17/00

[52] U.S. Cl. ....................................... 30/383; 30/382; 30/381

[58] Field of Search .................. 30/383, 382, 381, 274

[56] References Cited

U.S. PATENT DOCUMENTS

| | | | |
|---|---|---|---|
| 3,994,067 | 11/1976 | Hazzard et al. | 30/383 |
| 4,694,578 | 9/1987 | Kemmler | 30/383 |
| 4,727,651 | 3/1988 | Nakajima | 30/383 |
| 4,785,539 | 11/1988 | Nagashima | 30/382 |
| 4,785,540 | 11/1988 | Arvidsson | 30/381 |
| 4,856,195 | 8/1989 | Grossmann et al. | 30/383 |

*Primary Examiner*—Douglas D. Watts
*Assistant Examiner*—Paul M. Heyrana
*Attorney, Agent, or Firm*—Bauer & Schaffer

[57] ABSTRACT

A chain saw body having an upper and lower housing. The prime mover is lowered into the upper housing and held in place in shaped recesses for it. The upper housing is itself lowered onto the lower housing, which mounts the handles and defines a fuel tank. The upper and lower housings are connected via vibration dampening couplings.

5 Claims, 2 Drawing Sheets

CHAIN SAW

FIELD OF THE INVENTION

This invention relates to chain saws used for cutting and making timbers and particularly to a chain saw having an improved construction.

BACKGROUND OF THE INVENTION

In the conventional chain saw the crankcase of the prime mover is molded integral with the body which is generally made of a magnesium die-casting or similar material, and a handle frame is fitted through vibration dampening members or a guide bar structure to the body.

In such conventional chain saws several following problems have been encountered. Although the crankcase is required to be of high precision, the integral molding of the crankcase with the body makes the chain saw so large that a magnesium die-casting or the like is difficult to form and work, as a result of which the device becomes quite expensive.

While it is necessary to modify the shape and size of the body for each of the various chain saw models, the engine itself does not have to be modified to provide the required operational performance. Consequently, intergration of standard engines with standard bodies is not possible, and special moldings must be made each respective model.

Further, since the crankcase and the body are integral, the engine cannot be assembled in advance, and the manufacturing efficiency is low.

SUMMARY AND OBJECTS OF THE INVENTION

A first object of the present invention is to provide a chain saw wherein a magnesium alloy die-casting or the like of the required body is made easy and cheap.

A second object of the present invention is to provide a chain saw wherein the same prime mover can be used in several models.

A third object of the present invention is to provide a chain saw wherein the assembly can be efficient and simple.

In order to attain the above-mentioned objects, the chain saw according to the present invention is provided with a body having an upper housing into which the prime mover may be lowered and secured and a lower handle housing on which the upper body is lowered and connected thereto through vibration dampening members.

Since the prime mover is separate from its housing, it and its associated parts which are required to be precision-built can be maintained comparatively small. They can be easily formed and worked by magnesium die-casting or the like so that the saw can be made cheaply. Also, as the housing is separate from the prime mover, it is necessary only to modify the housing when necessary to effect model changes as the same prime mover can be used for many models and for general purposes. Further, as the prime mover is made separate from the fitting base or upper housing, the prime mover can be separately assembled in advance with high efficiency. In assembly the housing and prime mover can be easily joined in turn with the lower handle housing, thereby simplifying the task. By the way, as the upper housing is fitted to the handle frame through vibration dampening members, vibration dampening is also easily obtained.

BRIEF DESCRIPTION OF THE DRAWINGS

The drawings show a preferred embodiment of the present invention.

DETAILED DESCRIPTION OF THE PREFERRED EMBODIMENT

Figure 1:
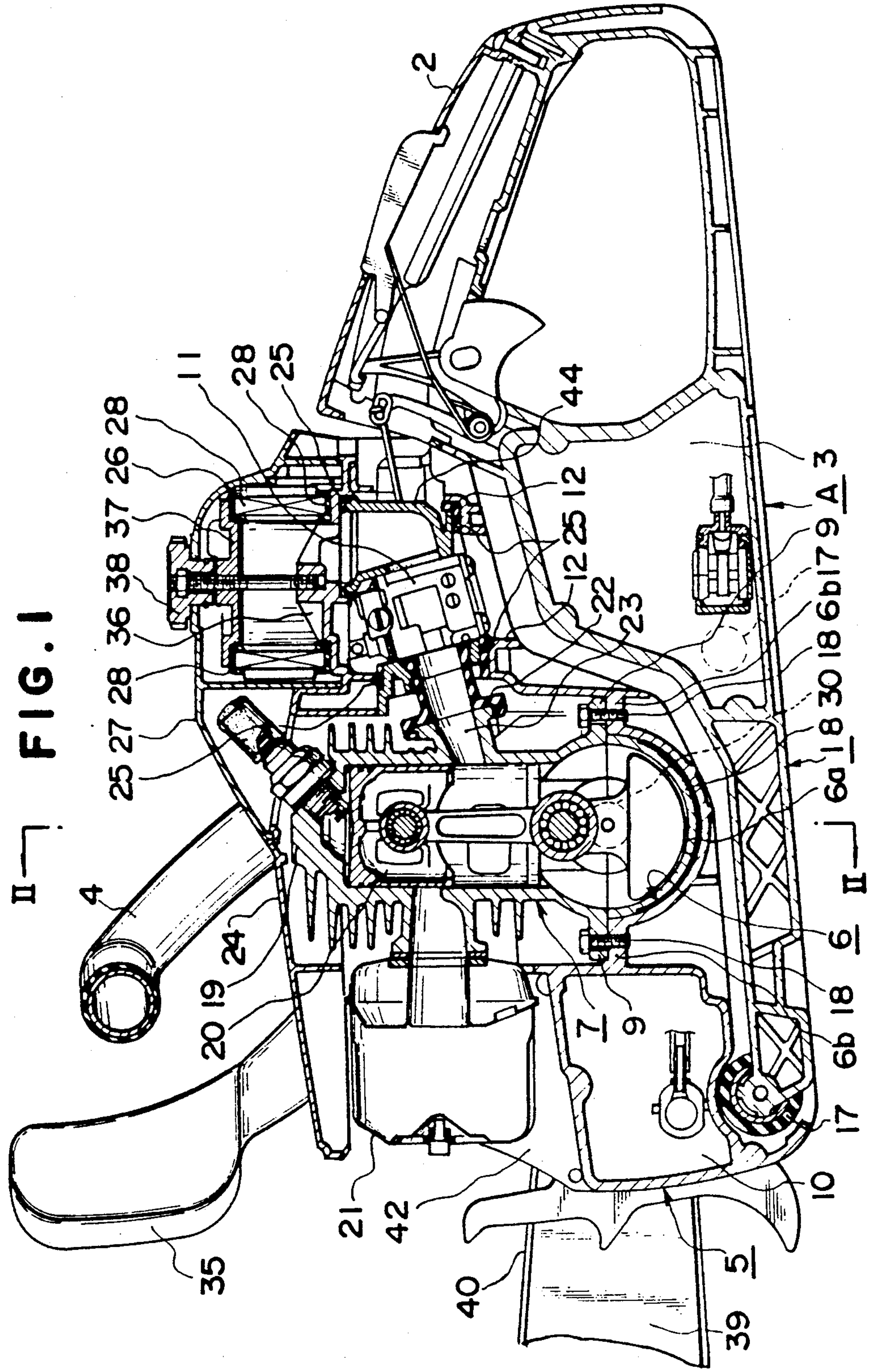
FIG. 1 is a vertically sectioned side view of the chain saw embodying the present invention.

The chain saw of the present invention, as illustrated in FIG. 1, is provided with a body, generally depicted by the letter A, having a lower handle frame 1 and an upper main frame 5. The lower handle frame is made of a strengthened plastic or the like, which is light in weight and high in strength and vibration absorption, in the form of a three-dimensional web on which is mounted a rear handle 2 and a front handle 4, and which contains an internal fuel tank 3.

Figure 2:
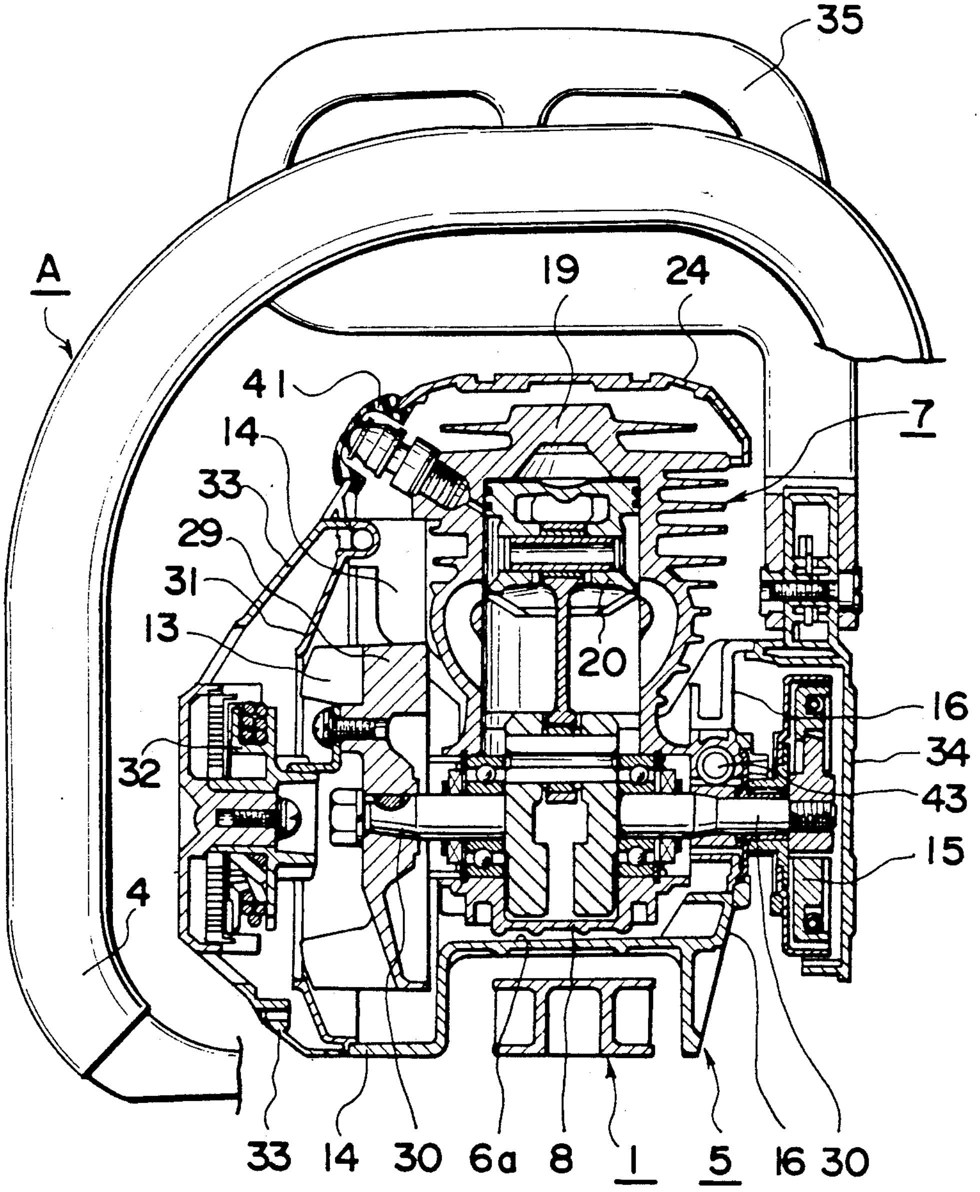
FIG. 2 is a sectioned view taken along the line II—II of FIG. 1.

The upper main frame 5 forms a housing base for a prime mover and associated parts. The frame 5 is a molded integrally of die-cast magnesium alloy, aluminum alloy, or, as desired, of a high rigidity synthetic resin of reduced weight and adequate strength. The main frame 5 is shaped to have a recess 6 substantially in its center, holding a shim **6*a* into which the lower half of the crankcase 8 of a small air-cooled two-cycle gasoline engine 7 (the prime mover) is inserted. The engine 7 is provided with flanges 9, integrally molded in the axial direction of the crankshaft 30 on the front and rear sides of the crankcase 8, which sit on shoulders 6*b* and are held securely by bolts 18. The main frame 5 is cast to provide at its front an oil tank 10 for lubricating oil for the saw chain. A saw chain 40, mounted on a guide bar 39, is attached to a fitting 42, integrally molded with the housing on the right side of the engine. A carburetor 11 is mounted to the rear of engine 7 on supports 12. As seen in FIG. 2, a subframe 14 is provided on the left side of the engine to house a cooling fan 13. A subframe 16 is provided on the right side of the engine so as to house a lubricating pump 43 and the other components of the centrifugal clutch 15**.

The above-mentioned main frame 5 is placed over the handle frame 1 and secured through the use of a number of vibration dampening members 17 at the front side lower positions and rear positions, as shown in FIG. 1. Other vibration dampening members are also used in the positions above the fuel tank 3, though not illustrated.

It is convenient that the engine 7 is cast as a two-piece engine having and upper cylinder section 19 and a lower crankcase 8, the two pieces being divided along the plane including the axis of the crankshaft 30 as a boundary. In this manner the piston 20 and internal parts of the engine may be easily assembled before the divided parts are integrally combined.

Also, as seen in the drawings, a muffler 21 is fitted to the exhaust of the cylinder 19, while the carburetor 11 is connected to the engine suction port 23 through a rubber suction pipe 22. The carburetor 11 is inserted downwardly into the upper housing to seat on supports 12 so that it will be prevented from moving in the forward, rearward, rightward, and leftward directions. A cover 24 is provided so that it may be bolted to the housing 5, preventing the engine and the carburetor from moving in the vertical direction. Vibration dampening members 25, which are also seals made of rubber or the like, are interposed around the suction pipe 22 and around the suction elbow 44 on the opposite side of the carburetor 11 so that the cylinder 11 may also be prevented from vibrating. An air cleaner 26 is located above the carburetor 11 and is held by a compression member 37 by a threaded bolt provided with a grip 38 set within a rear cover 27. In the drawings the reference numerals 28 above and below the above-mentioned air cleaner 26 represent vibration dampening members which are also seals made of rubber or the like.

As seen in FIG. 2, a fly wheel 29, integral with the cooling fan 13, is mounted onto the left of the engine 7. The cooling fan 13 is covered by an inner casing 31, outside of which is mounted a recoil starter 32 enclosed by a cover 33. The centrifugal clutch 15 is provided on the opposite side of the crankshaft 30 (right side of FIG. 2) and a guide bar 34 to which a front hand guard 35 is attached.

In assembling the chain saw A, the upper housing 5 is connected to the lower handle housing 1 via the vibration dampening members 17, with the engine 7 and the carburetor 11 connected to the engine 7 through the suction pipe 22, which are assembled in advance is lowered the engine recess 6 and carburetor cavity 12. The flanges 9 of the engine 7 is secured by bolts 18 from above, and the cylinder cover 24 is placed thereon. Further, the air cleaner 26 and its cover 27 are secured as well from above. By the way, it is needless to say that these assembling procedures may be properly varied as required such as fastening the above-mentioned bolts 18 to the housing 5 from below.

Further, the upper housing 5 and engine 7 can be subassembled by lowering the engine 7 into the housing 5 and thereafter lowering this subassembly onto the lower handle housing 1. Therefore, the assembling work is simple.

Also, the present invention is different from the conventional chain saw in that the upper housing 5 is separate from the engine 7 so that the degree of precision required for the crankcase 8 of the engine 7 does not have to be high to conform with a magnesium alloy die-casting or the like. Thus, the upper housing 5 will be easy to work, and the cost will be reduced.

Further, in the present invention, as the upper housing 5 is separate from the engine 7, it is necessary only to modify the housing 5 in response changes in the model of the unit, and the same engine 7 can be used for many uses and models and can be made general-purpose.

Also, since the engine 7 is separate, it can be separately assembled with its components in advance and the efficiency of the assemling work can be elevated.

By the way, as the upper housing is fitted to the lower handle housing 1 through the vibration dampening members 17, a high dampening effect is also obtained.

In the case of the illustrated embodiment, since the fuel tank 3 is molded integrally with the lower handle housing 1, the entire subassembly may be formed of a strengthened plastic separate from the upper housing. Thus, the oil tank 10 may itself be molded in the upper housing of a magnesium die-casting or the like. Thus, the heat generated from the engine 7 will not be conducted to the fuel tank 3 but will be easy to be conducted to the oil tank 10. Therefore, the disadvantage of overheating of the fuel will be prevented while the lubricating oil for the saw chain will be properly warmed thereby elevating the lubricating performance.

As explained in detail in the above, according to the present invention, other advantages are obtained, mainly since the magnesium alloy die-casting or the like is easy and cheap, the weight of the chain saw can be reduced while maintaining the required strength. Further, the prime mover can be made generaly-purpose and the assembling work can be made efficient and simple.

What is claimed is:

1. A chain saw comprising a body having an upper housing in which the components of the prime mover therefor are located and on which the saw chain is mounted and a lower housing containing a chamber defining a fuel tank and to which the handles for the chain saw are mounted, said upper housing being in part open for the insertion of said prime mover and components and having a recess for receiving the engine of the prime mover, said engine being removably fastening to said housing.

2. The chain saw according to claim 1, including vibration dampening means for connectably mounting said upper housing on said lower housing spaced from each other.

3. The chain saw according to claim 1, wherein the upper housing is open at its top and is shaped so that the recess is disposed below said opening and is formed with a cavity for receiving the crank case of the engine, said recess having a shoulder and said engine having extending flanges adapted to rest on said shoulder, and said fastening means comprising bolts securing said flanges to said shoulder.

4. The chain saw according to claim 1, wherein said lower housing is an integral molding of reinforced plastic and said upper housing is an integral casting of a magnesium or aluminum.

5. The chain saw a claim 4, wherein said upper housing is integrally cast with an oil tank for said engine.

* * * * *